Patented Aug. 9, 1938

2,126,187

UNITED STATES PATENT OFFICE 2,126,187

METHOD OF TREATING MEAT

Charles F. Gallagher, Lansing, Mich.

No Drawing. Application June 26, 1936,
Serial No. 87,467

3 Claims. (Cl. 99—159)

This invention relates to the process of treating meat to preserve its freshness and appearance and to the provision of a composition of matter for use in such treatment. The present invention relates particularly to the preservation of the freshness and appearance of ground meat such as sausage, hamburg, and the like.

Various compositions for and methods of treating such meat have been used heretofore. Some of them are very expensive, and others make use of a composition including ingredients which adversely affect the edibility of the meat. The present invention has for its object the provision of a composition for and a method of treating meat which is not only inexpensive, but which does not involve the use of any such objectionable ingredients.

According to the present invention a composition consisting of preferably 48% bicarbonate of soda, 48% sugar, and 4% paprika is thoroughly mixed with the ground meat to be treated in preferably the proportion of 8 ounces of composition to 100 pounds of meat. It has been ascertained by experimentation that such treatment not only preserves the fresh appearance of the meat but also retards the spoilage of the meat, as by oxidation and the like. It has further been ascertained by experimentation that while the percentages just quoted are preferred, satisfactory results can be obtained by varying such percentages within limits of 45 to 49% bicarbonate of soda, 45 to 49% sugar, and 2 to 10% paprika.

The particular proportions just specified are important. Where a greater percentage of sugar or paprika is used, the meat is discolored. If the percentage of bicarbonate of soda is increased, an objectionable odor results and upon cooking the meat it has a tendency to burn. Likewise, it is important that each of the three specified ingredients be used. The omission of any one of the three or a substantial deviation from the proportions given above will not produce the desired result.

Of course, the bicarbonate of soda, sugar and paprika, in the specified proportions, are thoroughly and homogeneously mixed with each other before being applied to the meat to be treated. This composition may be applied to the meat before it is ground, while it is being ground, or after it has been ground, as desired, the only essential in this regard being that the composition be homogeneously mixed with the ground meat.

One advantage of the present method of treating ground meat is that while delaying the deterioration of the meat, as by oxidation and the like, it nevertheless does not conceal the fact of deterioration when the same has occurred, because it does not offset or conceal the characteristic odor of meat which has so deteriorated. In other words, the present process actually delays the deterioration of the meat while preserving its appearance of freshness.

The scope of the invention is indicated by the appended claims:

1. The process of treating ground meat to preserve its freshness and appearance which consists of thoroughly mixing therewith a composition consisting of approximately 45 to 49% of bicarbonate of soda, 45 to 49% of sugar and 2 to 10% of paprika in the proportion of approximately 5 to 10 ounces of composition to 100 pounds of meat.

2. The process of treating meat to preserve its freshness and appearance which consists of grinding the meat with a composition consisting of approximately 45 to 49% of bicarbonate of soda, 45 to 49% of sugar, and 2 to 10% of paprika, in the proportions of approximately 5 to 10 ounces of composition to 100 pounds of meat.

3. A new product comprising ground meat homogeneously mixed with a composition consisting of approximately 45 to 49% bicarbonate of soda, 45 to 49% sugar, and 2 to 10% of paprika, in the proportion of approximately 5 to 10 ounces of composition to 100 pounds of meat.

CHARLES F. GALLAGHER.